United States Patent [19]

Reisgies et al.

[11] Patent Number: 4,548,161

[45] Date of Patent: Oct. 22, 1985

[54] MILK WEIGHT METERING METHOD AND APPARATUS

[75] Inventors: Rolf W. Reisgies, Waunakee, Wis.; Michael L. Kvalo, Safety Harbor, Fla.

[73] Assignee: Germania Dairy Automation, Inc., Waunakee, Wis.

[21] Appl. No.: 521,412

[22] Filed: Aug. 8, 1983

[51] Int. Cl.⁴ .............................................. A01J 9/08
[52] U.S. Cl. .................................................. 119/14.17
[58] Field of Search ................... 119/14.17; 177/208, 177/254

[56] References Cited

U.S. PATENT DOCUMENTS

| 2,960,328 | 11/1960 | Tate | 177/254 |
| 3,736,999 | 6/1973 | Lademann | 177/208 |
| 3,841,756 | 10/1974 | Grochowicz | 119/14.17 X |
| 4,433,577 | 2/1984 | Khurgin et al. | 119/14.17 X |

FOREIGN PATENT DOCUMENTS 1316573  9/1973  United Kingdom.

OTHER PUBLICATIONS

Fullwood and Bland—Modern Milking, No. 4, Winter 1981/82, "Beyond the Pail".

Primary Examiner—Hugh R. Chamblee
Attorney, Agent, or Firm—Isaksen, Lathrop, Esch, Hart & Clark

[57] ABSTRACT

A milk weight metering apparatus (10) is disclosed which uses a standard glass milk weigh jar (14) which is suspended from a load cell weight measuring unit (15). A hydraulic output line (16) extends from the weight measuring unit (15) to a pressure transducer (17) at a position remote from the cow being milked, preferably outside the milking parlor. As milk accumulates within the milk weigh jar (14) greater pressure is provided on fluid sealed within a chamber defined by a load cell body (55) and a diaphragm (63), which pressure is transmitted through the hydraulic line (16) to the pressure transducer. The change in weight of the suspended weigh jar (14) after the milk has been accumulated therein will be proportional to the change in the pressure in the hydraulic line (16), allowing the weight, and thereby the volume, of the milk from the cow to be determined and recorded. The production from the cow may also be correlated with the cow's identity and the time of milking.

9 Claims, 6 Drawing Figures

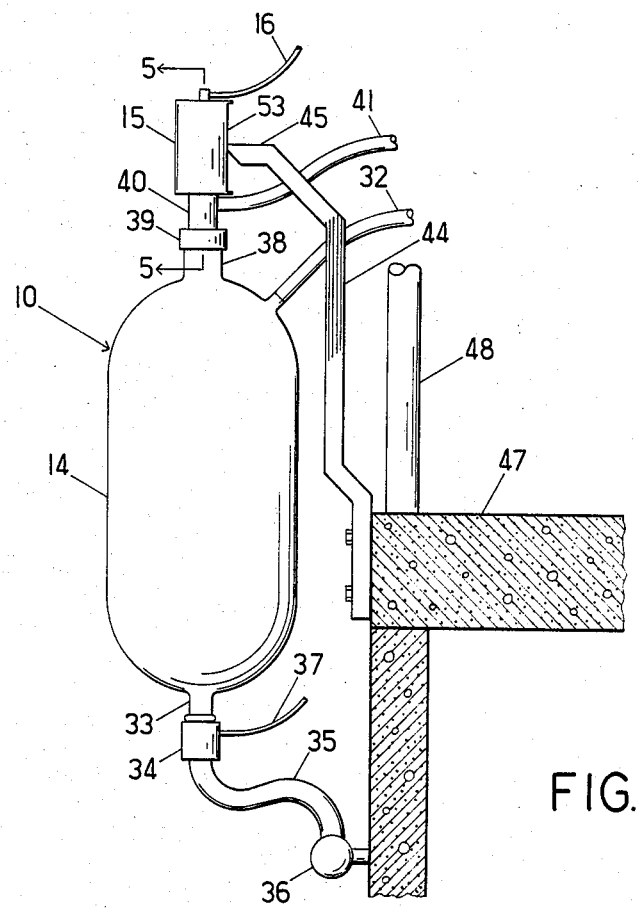
FIG. 2
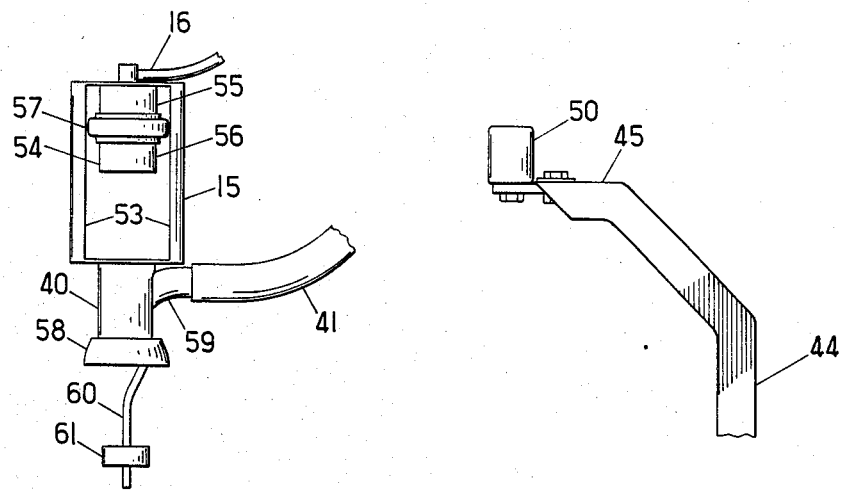
FIG. 3
FIG. 4

MILK WEIGHT METERING METHOD AND APPARATUS

TECHNICAL FIELD

This invention pertains generally to the field of dairy equipment and particularly to systems and devices for measuring and recording the amount of milk given by a cow.

BACKGROUND ART

Milking cows vary substantially in their milk producing capabilities. The high producing cows are much more valuable than the low producers since they yield a greater quantity of milk than the low producers for the same quantity of feed and care. By monitoring the output of individual cows, the dairyman can identify his high and low producers and use this information to improve the quality of his herd by culling the low producers. It may also be possible to use this information to increase the volume of milk production per quantity of feed to the herd since evidence exists that the total milk production from a herd can be optimized by providing a larger amount of feed to the high producing cows than to the lower producers.

The daily monitoring of milk production from individual cows can also have benefits in addition to identifying the high and low producing cows. For example, a decrease in production from a particular cow over a short period of time may indicate that the cow may be sick before other, more obvious symptoms develop in the cow. The dairyman may also use the milk production records to determine the effect on milk production of different feeds or feed supplements, allowing him to choose the feeding regimen which will provide him with the lowest cost production. The monitoring of milk production from individual cows allows the feeding regimen to be even further refined, if desired, by choosing feeds and supplements which are best suited to achieve the optimum production from individual cows.

Several types of equipment are presently available for use in monitoring the output of cows during milking. The most common and simple apparatus is a glass milk jar which is connected to the milk line and which accumulates the milk from each cow. After milking of the cow is completed, the dairyman records the identity of the cow and reads the volume of milk contained within the jar by comparing the level of milk with indicia etched in the glass, and thereafter opens a valve at the bottom of the jar to release the milk into a common milk line. While the apparatus involved is simple and relatively inexpensive, monitoring the milk in this manner requires a substantial amount of the dairyman's time and is subject to substantial measurement errors since the visual reading of the level of milk within the milk jar requires some judgment. Systems are also available which automatically monitor the milk flow from the cow using flow meters of various designs, typically of the rotating vane or cup type. In the simplest of these systems, the meters provide a visual display to the milking machine operator of the volume of milk that is passed through the meter, and the operator then manually records the milk volume and the identity of the cow from which the milk was taken. More complex and automated systems may require only that the operator log in the identity of the cow being milked on a keyboard, with the measured milk volume and the cow's identity being automatically recorded on a remote printout or stored for further processing in a microcomputer. Automatic cow identification systems are also available, and the identity of the cow so monitored may be correlated with the milk volume monitored by the milk meter and this information may be either recorded immediately or stored in a microcomputer for processing.

Some disadvantages have been noted with the use of flowmeters to measure milk production. When used to measure milk flow directly from a cow, flowmeters can be subject to measurement errors, in part because of the intermittent nature of the milk flow and the mixing of air with the milk. Because the milk is passed directly from the flowmeter to a common milking line, it is not possible for the dairyman to manually verify the measurements obtained from the flowmeters. Flow measuring devices generally have rotating and moving parts which are naturally subject to wear and breakdown over time. Currently available flowmeters typically also use electrical signaling, so that a low voltage electrical wire must be run into the milking parlor to the flowmeter at a position close to the cow. The potential thus exists for short circuits and ground leakage of the currents in the electrical signaling lines, particularly in the damp environment of the milking parlor. These stray currents may possibly be conducted to the cow, potentially irritating the cow and interfering with milk production.

SUMMARY OF THE INVENTION

The milk weight metering apparatus of the present invention utilizes a standard glass milk weigh jar suspended from a hydraulic load cell weight monitoring unit which is responsive to the total weight of the jar and its contents. As the weigh jar is filled with milk from the cow, the increasing load imposed by the jar and its contents on the load cell is reflected in an increasing pressure provided by the load cell on an output line, filled with liquid, which extends from the stall area where the cow is milked to a remote location outside the milking parlor. There the hydraulic output line is connected to a pressure transducer which converts the pressure signal in the line to a proportional electrical signal. The electrical signal may then be supplied to a recording device for recording in analogue form, digitized for recording in digital form, or converted to a digital output signal which is supplied to a microcomputer and stored for further processing. Because the milk is supplied to a standard weigh jar, a minimum of additional equipment investment is required by the dairyman to convert to automatic monitoring of milk production, and the existence of the weigh jar enables the dairyman to manually verify the milking figures provided automatically. The apparatus utilizes no moving parts in its monitoring of the milk production, thereby minimizing mechanical wear and breakdowns, and no additional complex surfaces or milk conduits are required, minimizing possible accumulations of solids in the milk flow lines with their potential risk of clogging and contamination. Because the signal indicative of the milk weight originates in the milking parlor as a hydraulic signal rather than an electrical signal, the possibility of shorts and stray currents which might irritate the milking cows is eliminated.

The load cell weight measuring unit includes an outer housing having a lower mounting post depending from it which is adapted to extend into the top open mouth of the milk weigh jar. The mounting post also includes a fitting adapted to mate with a connector which screws onto the top of the weigh jar to hold the weigh jar on the post of the load cell. Within the housing is mounted a load cell which includes upper and lower load cell bodies having mating cylindrical interiors and a flexible diaphragm mounted between the upper and lower load cell bodies. A suitable incompressible fluid fills the upper load cell body and extends into the output line which is in communication with the cylindrical interior of the upper body; thus, upward pressure on the diaphragm will apply pressure to the fluid within the upper load cell body which will in turn be transmitted through the output line. The entire assembly of weigh jar and load cell housing is supported on a cylindrical plunger which fits into the interior of the lower load cell body and engages the flexible diaphragm so that the weight of the assembly is supported by the top face of the plunger and is opposed by the hydraulic liquid within the upper load cell body acting on the diaphragm. The plunger itself is supported on a cantilevered arm portion of a mounting bracket which is attached to a suitable support such as a wall within the milking parlor. This mounting of the weigh jar and load cell housing assembly allows the entire assembly to be easily removed from its mounting support on the mounting bracket and plunger so that it can be replaced or cleaned at another location if desired. Although the load cell support structure as described is quite simple and economical, it provides an output pressure signal from the load cell which is accurately and reliably related to the weight of the milk jar and its contents.

In more fully automated systems, a remotely controllable valve is provided at the bottom outlet of each weigh jar and is controlled by another system element such as an automatic detacher to remain closed until the milking cycle has been completed and the milk weight recorded and thereafter to open for a period of time sufficient to allow the milk to drain from the weigh jar. Information concerning the initiation and cessation of milking can be transmitted by a signal from an automatic detacher to an interface unit which supplies the information to a microcomputer, and information concerning the identity of the cow obtained either from manually inserted data provided by the operator or from an automatic cow identification system can similarly be supplied to the computer through an interface to allow the milk weight data from each cow to be correlated with the identity of that cow and the cow's milking time. The milking time can also be determined direcly from the milk weight data by measuring the period of time between the initial change in weight and the cessation of changes in weight. The milking time data can be used to monitor the condition of the milking equipment since statistically significant changes in milking times at a specific stall are an indicator of equipment problems at the stall.

Further objects, features and advantages of the invention will be apparent from the following detailed description taken in conjunction with the accompanying drawings.

BRIEF DESCRIPTION OF THE DRAWINGS

In the drawings:

FIG. 2 is a side elevation view of the milk weight metering apparatus of the invention mounted in position in a milking parlor.

FIG. 3 is a front elevation view of the load cell weight monitoring unit.

FIG. 4 is a side elevation view of a portion of the mounting bracket of the apparatus.

BEST MODE FOR CARRYING OUT THE INVENTION

Figure 1:
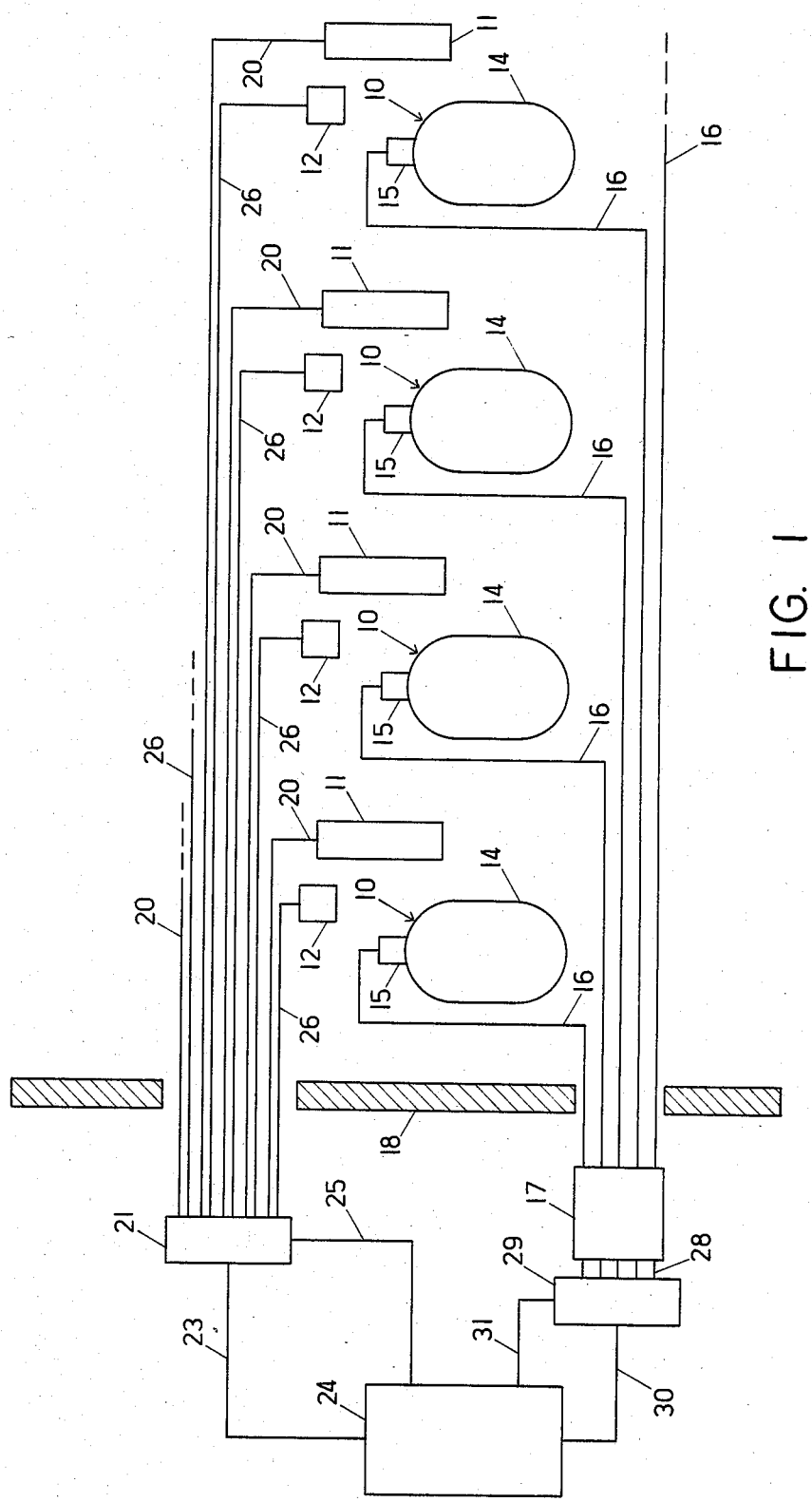
FIG. 1 is a schematic view showing a typical arrangement of milk weight metering apparatus in accordance with the invention connected for central recording of the milk weight data.

With reference to the drawings, FIG. 1 shows a schematic layout of a milking parlor which includes a plurality of milk weight measuring apparatus denoted generally at 10 which are adjacent to each of the milking stalls in the parlor. Although not essential to the operation of the present invention, each of the milking stalls may also include an automatic detaching unit, generally represented by the block labeled 11, and an automatic cow identification unit, represented generally at 12.

The apparatus 10, which includes a milk weigh jar 14 and a load cell weight metering unit 15, provides an output signal on a hydraulic output line 16 to pressure transducers represented at 17 which are located at a position remote from the cow being milked and preferably outside of one of the walls 18 of the milking parlor. The milking parlor may, and typically will, have additional milking stalls providing additional pressure signals on other output lines 16.

Modern automated milking parlors often include the automatic detacher units 11 which are capable of sensing the cessation of milk flow from the cow and thereafter shutting off the milking vacuum to the cow and drawing the milking claw away from the cow. As a consequence of their control of the milking operation from the start of milking to the end of milking, the detachers 11 will generally have signals available which indicate the beginning and end of milking. These signals, which commonly are electrical or pneumatic, are provided on output lines 20 which extend through the wall 18 where they are available for connection to a recording device or other unit which will process the signals. For illustration, the output lines 20 are connected to an analog to digital converter and interface unit 21 which provides an output signal on an output line or bus 23 to a microcomputer 24. The microcomputer itself is capable of controlling the converter 21 and selecting which of the input lines 20 will be sampled at any given time by control signals provided to the converter on a control line 25. The output signals from the cow identification unit 12 are similarly provided on output lines 26 to the converter 21 where they are available for entry into the computer 24 when the computer is ready to read in this data. Of course, output lines 20 and 26 would also be provided from the corresponding detachers 11 and identification units 12 located at the other milking stalls not shown in FIG. 1.

The ouput of the pressure transducers 17, provided on electrical output lines 28, are supplied to an analog to digital converter and interface unit 29 which has its digital output connected on a line or bus 30 to the microcomputer 24. The operation of the converter 29 is controlled by the microcomputer by signals provided to the converter 29 on a control line 31. Of course, it is understood that the microcomputer system 24 would further include input-output devices which would allow communication to and from the operator.

In a fully automatic operating mode, the milking cycle is started for a particular cow in one of the stalls by the milking machine operator who attaches the milking claw to the cow and presses a button on the detacher unit 11 to initiate milking. The detacher puts out a signal on its output line 20 indicating that milking has started; this signal is passed through the converter 21 to the computer 24, which thereafter sends a signal along the line or lines 26 leading to the automatic cow identification device 12 to actuate the device and cause it to determine the identity of the particular cow being milked. The computer also begins the timing of the milking operation and monitors the output signal from the sensor 17 connected to the particular hydraulic line 16 which leads to the weight monitoring apparatus 10 adjacent to the cow being milked to establish a baseline pressure corresponding to an empty weigh jar. When the detacher 11 determines that milking is completed, it puts out an output signal in the line 20 to the computer which thereafter stops the timing of the milking cycle and records the milking time and the identity of the cow as determined from the cow identification unit 12. Of course, while the identification unit 12 may encompass an automatic system, such as a tag on the cow responsive to a microwave signal or a magnetic field signal, the cow's identity may be manually supplied to the computer by the operator by punching in the cow's identification code onto an input keyboard in the milking parlor. At the end of the milking time, the computer also records the final digitized input signal received from the transducer 17 that is connected to the output line 16 extending to the weighing apparatus 10 at the cow being milked. This final output signal pressure is then compared with the original signal before milking to provide a differential pressure which may then be correlated with the actual weight of the milk within the weigh jar. The computer thus associates the identity of the particular cow milked with the time of milking and the weight of the milk within the weigh jar 14 and stores this information for further processing or for reading out to the operator at a later time. Preferably, a short and predetermined period of time after the end of milking, the detacher puts out a signal to a valve (not shown in FIG. 1) which opens and allows the milk within the jar 14 to drain out of the bottom into a common milk line. After sufficient time has been provided for the milk to drain out of the jar 14, the detacher 11 will provide another signal (or remove the first signal) to cause the valve connected to the jar 14 to close once again so that the milking cycle can be reinitiated.

As shown in FIG. 2, the weigh jar 14 of the apparatus 10 is preferably formed of glass or other transparent material so that the milk therein can be viewed by the operator. The milk is supplied from the milking claw through a line 32 into the top part of the jar 14. Milk exits through a discharge pipe 33 at the bottom of the jar through an automatically operable valve 34 and into a flexible line 35 leading to a common milk line 36 which is adapted to receive milk from several of the weigh jars. The valve 34 is controlled to open or close by a signal from the detacher 11 transmitted on a control line 37. The jar 14 has an upper neck 38 by which it is connected to and suspended from the load cell weight metering unit 15. A threaded collar 39 screws onto the top of the neck 38 and releasably connects the weigh jar 14 to a depending mounting post portion 40 of the load cell monitoring unit 15. In the particular embodiment shown in FIG. 2 the milking vacuum line 41 extends through the mounting post 40 and thence into communication with the interior of the weigh jar 14 to provide a vacuum to the interior of the weigh jar and therefore a vacuum draw on the milk line 32.

The milk weight monitoring apparatus 10 is suspended from a mounting bracket 44 which has a cantilevered arm portion 45 which engages the load cell weight monitoring unit 15. The bracket 44 can be mounted to any convenient support structure in the milking parlor, being illustratively shown bolted to the concrete floor 47 of the milking stall next to one of the stall stanchion posts 48.

As shown in FIG. 4, illustrating the outer end portion of the mounting bracket 44, a cylindrical plunger 50 is mounted to the outer end of the cantilevered portion 45 of the mounting bracket in an upright orientation. The load cell weight monitoring unit 15 is supported on the plunger 50, as best explained with reference to the front elevation view of the load cell weight monitoring unit 15 shown in FIG. 3. The unit 15 has an outer cylindrical housing 52 with an opening formed therein defined by side edges 53 which is wide enough to allow the plunger 50 and the extending cantilever portion 45 of the bracket to be inserted into the housing. Within the housing 52 is mounted a load cell 54 which includes an upper load cell body 55, a lower load cell body 56 and a coupling ring 57 which joins the upper and lower load cell bodies together. The upper and lower load cell bodies preferably have cylindrical exteriors and mating cylindrical interiors. The plunger 50 is inserted into the opening in the housing 52 and then up into the interior of the lower load cell body 56, whose interior cavity generally conforms to the shape of the plunger 50, until the plunger contacts a diaphragm (not shown in FIG. 3). An expanded fitting 58 is mounted to the bottom of the depending post 40 and is adapted to cooperate and engage with the connector collar 39 which screws onto the neck 38 of the weigh jar 14. A curved inlet pipe 59 extends through the interior of the post 40 and opens at the bottom of the fitting 58, being connected at its outer end to the vacuum line 41. A cylindrical spray deflecting block 60 is mounted on the end of a rod 61, itself connected to the bottom of the fitting 58, at a position directly beneath the outlet of the pipe 59. The purpose of the spray deflector 60 is to deflect any water or other washing solution that may be injected into the weigh jar through the pipe 59 during clean up of the milking equipment after milking operations have been completed.

Figure 5:
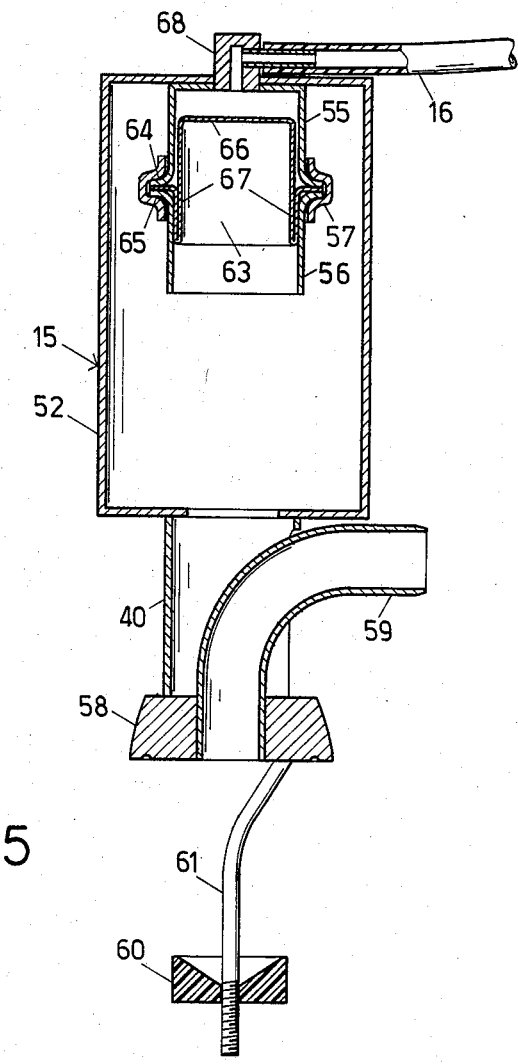
FIG. 5 is a cross-sectional view of the load cell weight monitoring unit taken generally along the lines 5—5 of FIG. 2.

The construction of the unit 15 is also illustrated in the cross-sectional view of FIG. 5. A flexible diaphragm 63, formed of rubber or plastic which may be reinforced with a strengthening material such as nylon, is mounted between the upper and lower load cell bodies 55 and 56, with the outer periphery of the diaphragm 63 being engaged by flat extending rim portion 64 of the upper body and the rim portion 65 of the lower body. The rims 64 and 65 are themselves engaged by the coupling ring 57 to hold the upper and lower bodies together. The diaphragm 63 is preferably formed to have a flat, circular central portion 66 and a cylindrical skirt 67, folded back upon itself, and defining a generally cylindrical inner volume which is sized to fit the exterior of the cylindrical plunger 50. The diaphragm 63 thus effectively seals off the cavities in the upper and lower cell bodies from each other. The hollow interior cavity of the upper cell body 55 is filled with an incompressible liquid, such as hydraulic oil or alcohol, and this liquid also extends up through a top outlet pipe 68 which is in communication with the outlet line 16. As long as the outlet line 16 is blocked at the transducer 17, and the cavity in the upper body 55 and the interior of the outlet line 16 are completely filled with fluid and free of air pockets, the engagement of the plunger 50 with the top of the diaphragm 63 will cause the fluid within the upper body 55 to exert a corresponding equal and opposite force onto the diaphragm 63 and thence to the plunger to carry the weight that is imposed on it without substantial displacement of the diaphragm. In effect, the weigh jar is supported hydraulically so that the pressure exerted by the weight of the jar and its contents is balanced by the pressure in the hydraulic fluid confined in the upper cell body 55 and in the outlet line 16.

The pressure on the liquid within the upper body 55 will be transmitted through the hydraulic line 16 to the transducer which produces a signal proportional thereto. Some upward movement of the diaphragm 63 as it is engaged by the plunger 50 is to be expected, due to the slight expansion of the flexible hydraulic line 16 over its length and the compression of any air bubbles remaining in the hydraulic fluid. However, the expansion of the hydraulic line or other components and compression of air within the line does not substantially affect the accuracy of the measurement of the weight of the apparatus 10 since the hydraulic pressure being measured at the transducer is a static pressure measured after the system is stabilized. The weight of milk in the jar is preferably determined in proportion to the difference between the pressures measured at the start and end of milking rather than the absolute pressure levels, which may vary with temperature and other conditions. The coefficient of proportionality may be determined experimentally by separately weighing the milk in the weigh jar which has been measured by the foregoing procedure.

The double folding of the skirt 67 of the diaphragm 63 allows for some inward movement of the central portion 66 of the diaphragm as the weight of the milk in the weigh jar increases without the diaphragm itself being stressed. Thus, the diaphragm does not itself resist any of the pressure imposed by the plunger but rather all of the pressure on the diaphragm is resisted solely by the liquid within the interior cavity of the upper body 55.

Figure 6:
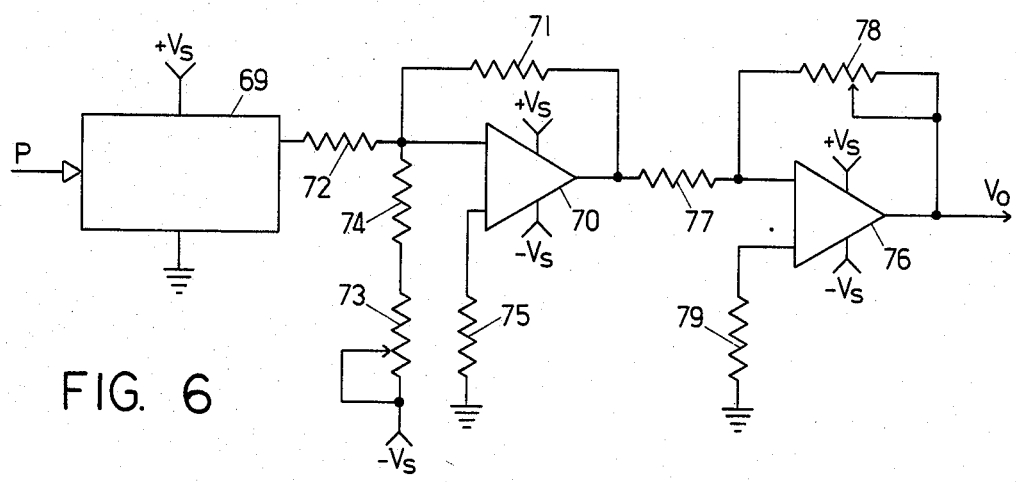
FIG. 6 is a schematic circuit diagram illustrating the conversion of the hydraulic pressure signal from the load cell weight monitoring unit to an electrical output signal.

A schematic of the pressure transducer 17 circuit arrangement is shown in FIG. 6, illustrating the pressure P in the hydraulic line 16 being supplied to a standard pressure transducer 69 (e.g., Motorola 142PC15A) which is provided with a supply voltage Vs. The output of the transducer 69 may be scaled and offset by the circuit shown, which includes a first operational amplifier 70 with a feedback resistor 71, input resistor 72, and an offset null adjustment variable resistor 73 in series with a fixed resistor 74 which allows the output of the amplifier 70 to be adjusted to a desired voltage level at a particular output from the transducer 69 corresponding to the zero weight level. The non-inverting input of the amplifier 70 is connected to ground through a fixed resistor 75. For example, the resistance of the resistor 73 may be adjusted so that when the weigh jar is empty, the output of the amplifier 70 is at a desired zero output level (e.g. zero volts). A second operational amplifier 76 receives the input from the amplifier 70 through an input resistor 77, and includes a variable resistance feedback resistor 78 and a biasing resistor 79 connected to its non-inverting input. Adjustment of the variable feedback resistor 78 allows the overall gain from the output of the amplifier 70 to the output of the amplifier 76 to be adjusted so that the maximum output voltage from the amplifier 76 at a maximum expected weight within the milk jar will be equal to the approximate maximum voltage value that is desired in the further signal processing components.

It is understood that the invention is not confined to the particular construction and arrangement of parts herein illustrated and described, but embraces such modified forms thereof as come within the scope of the following claims.

What is claimed is:

1. Milk weight metering apparatus for measuring the milk produced by a cow during a milking cycle, comprising:
   (a) a milk weigh jar having an upwardly extending neck and an open mouth at the top thereof, an outlet for milk from the jar, and an inlet to the jar for flow therein of the milk from a milking machine at the cow;
   (b) a load cell milk weight measuring unit comprising:
      (1) a load cell housing,
      (2) means for attaching the milk weigh jar to the bottom of the housing,
      (3) upper and lower load cell bodies mounted in the load cell housing, the upper and lower load cell bodies having interior cavities, the cavity within the lower load cell body adapted to have a cylindrical plunger inserted therein,
      (4) a flexible diaphragm mounted between the upper and lower load cell bodies to seal off the cavities therein from each other,
      (5) a hydraulic output line connected at one end to be in communication with the cavity in the upper load cell body and extending to a position remote from the position of the weigh jar, hydraulic fluid filling the interior cavity of the upper load cell body and the hydraulic line;
   (c) a mounting bracket adapted to be mounted to a structure in the milking parlor and having a cantilevered arm portion with an upright plunger at the end thereof, the plunger adapted in size and shape to fit into the cavity in the lower load cell body and to apply pressure to the diaphragm therein, the load cell weight measuring unit and weigh jar being supported on the plunger inserted into the cavity in the lower load cell body.

2. The apparatus of claim 1 wherein the diaphragm has a flat central portion, a cylindrical skirt extending from the flat central portion and folded back upon itself, and a flat peripheral portion extending outwardly from the folded skirt which is held between the upper and lower load cell bodies.

3. The apparatus of claim 1 including a milk flow valve connected to the outlet of the weigh jar normally blocking the flow of milk from the jar and responsive to a control signal to open and allow the milk in the weigh jar to drain therethrough.

4. The apparatus of claim 1 including pressure transducer means connected to the remote end of the hydraulic line for converting the hydraulic pressure in the line into an electrical signal proportional thereto.

5. The apparatus of claim 4 including:
   (a) means for providing signals indicating the beginning and end of milking from the cow;
   (b) means for providing an output signal indicating the identity of the cow being milked; and
   (c) means for correlating the identity of the cow which is milked with the weight of the milk as indicated by the output signal from the pressure transducer indicative of the weight of the milk in the weigh jar.

6. The apparatus of claim 1 wherein the means for attaching the milk weigh jar to the load cell housing includes a mounting post depending downwardly from the bottom of the load cell housing and extending into the milk weigh jar and an expanded fitting at the bottom of the mounting post, and including a coupling collar extending around the fitting and threaded onto the neck of the milk weigh jar.

7. The apparatus of claim 6 wherein a pipe extends through the mounting post from an initial connection position outside of the weigh jar to an outlet at the bottom of the mounting post in communication with the interior of the weigh jar whereby a vacuum draw applied to the pipe will provide a draw on the interior of the weigh jar and thereby allow the milking vacuum to be transmitted from the weigh jar to the milking unit on the cow.

8. A load cell milk weight measuring unit for measuring the weight of a milk weigh jar and its contents comprising:
   (a) a load cell housing;
   (b) upper and lower load cell bodies mounted in the load cell housing, the upper and lower load cell bodies having interior cavities, the cavity within the lower load cell body adapted to have a cylindrical plunger inserted therein;
   (c) a flexible diaphragm mounted between the upper and lower load cell bodies to seal off the cavities within the two bodies from each other, such that a cylindrical plunger inserted in the cavity in the lower load cell body can contact the diaphragm separating the cavities in the upper and lower load cell bodies;
   (d) a hydraulic output line in communication with the cylindrical interior of the upper load cell body and extending to a remote location; and
   (e) means for attaching a milk weigh jar to the load cell housing which includes a mounting post depending downwardly from the bottom of the load cell housing and extendable into the milk weigh jar and an expanded fitting at the bottom of the mounting post, and a coupling collar extending around the fitting and adapted to thread onto the neck of the milk weigh jar.

9. The unit of claim 8 wherein a pipe extends through the mounting post from an initial connection position outside of the weigh jar to an outlet at the bottom of the mounting post in communication with the interior of the weigh jar whereby a vacuum draw applied to the pipe will provide a draw on the interior of the weigh jar and thereby allow the milking vacuum to be transmitted from the weigh jar to a milking claw on the cow.

* * * * *